US008945242B2

(12) United States Patent
Mineya et al.

(10) Patent No.: US 8,945,242 B2
(45) Date of Patent: Feb. 3, 2015

(54) METHOD FOR PRODUCING LITHIUM-ION BATTERY (75) Inventors: Kunihiko Mineya, Osaka (JP); Tatsuki Hiraoka, Hyogo (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 13/884,836

(22) PCT Filed: Nov. 28, 2011

(86) PCT No.: PCT/JP2011/006616
§ 371 (c)(1),
(2), (4) Date: May 10, 2013

(87) PCT Pub. No.: WO2012/077293
PCT Pub. Date: Jun. 14, 2012

(65) Prior Publication Data
US 2013/0232773 A1 Sep. 12, 2013

(30) Foreign Application Priority Data

Dec. 10, 2010 (JP) .................................. 2010-276120

(51) Int. Cl.
*H01M 6/00* (2006.01)
*H01M 2/00* (2006.01)
*H01M 2/02* (2006.01)
(Continued)

(52) U.S. Cl.
CPC ........ *H01M 10/0587* (2013.01); *H01M 2/1673* (2013.01); *H01M 10/052* (2013.01); *Y02E 60/122* (2013.01)
USPC .......................... 29/623.5; 429/164; 429/163

(58) Field of Classification Search
CPC .......... H01M 2/1673; H01M 10/0587; H01M 10/052
USPC ......................................... 29/623.5; 429/163
See application file for complete search history.

(56) References Cited

U.S. PATENT DOCUMENTS 7,709,141 B2   5/2010   Kim et al.
2005/0048369 A1   3/2005   Koshina et al.

FOREIGN PATENT DOCUMENTS

JP   11-102722 A   4/1999
JP   11-176476 A   7/1999
(Continued)

OTHER PUBLICATIONS

International Search Report issued in International Patent Application No. PCT/JP2011/006616 mailed on Feb. 14, 2012.
(Continued)

*Primary Examiner* — Helen O Conley
(74) *Attorney, Agent, or Firm* — McDermott Will & Emery LLP (57) ABSTRACT

A positive electrode plate 5, a separator 7, and a negative electrode plate 6 are prepared. The positive electrode plate 5, the separator 7, and the negative electrode plate 6 are combined so as to form a spirally-wound electrode assembly 4. A winding end portion 9 of the electrode assembly 4 is fixed with a heat-sensitive adhesive (preferably, a heat-sensitive adhesive tape 10) whose adhesive force can be reduced by heating or cooling. The electrode assembly 4 is placed in an outer casing 1, and then the ambient temperature of the electrode assembly 4 is adjusted so that the electrode assembly 4 is loosened due to reduction in the adhesive force of the heat-sensitive adhesive. An electrolyte solution is injected into the outer casing 1.

9 Claims, 5 Drawing Sheets

(51) Int. Cl.
*H01M 10/0587* (2010.01)
*H01M 2/16* (2006.01)
*H01M 10/052* (2010.01)

(56) References Cited

FOREIGN PATENT DOCUMENTS

| JP | 2000-195549 A | 7/2000 |
|---|---|---|
| JP | 2000-355684 A | 12/2000 |
| JP | 2003-257495 A | 9/2003 |
| JP | 2005-100959 A | 4/2005 |
| JP | 2005-260187 A | 9/2005 |
| JP | 2005 302844 A | 10/2005 |
| JP | 2007-184234 A | 7/2007 |
| JP | 2011-034859 A | 2/2011 |

OTHER PUBLICATIONS

Article by Hitachi Maxell, Ltd.: http://www.maxell.co.jp/dbps_data/_template_/_user_/_SITE_/localhost_res/htdocs/news/2010_res/news_pdf/news100422.pdf, Apr. 22, 2010, accessed on Sep. 22, 2014.

STEP 1

STEP 2

STEP 3

STEP 4

STEP 5

STEP 6

METHOD FOR PRODUCING LITHIUM-ION BATTERY

RELATED APPLICATIONS

This application is the U.S. National Phase under 35 U.S.C. §371 of International Application No. PCT/JP2011/006616, filed on Nov. 28, 2011, which in turn claims the benefit of Japanese Application No. 2010-276120, filed on Dec. 10, 2010, the disclosures of which Applications are incorporated by reference herein.

TECHNICAL FIELD

The present invention relates to a method for producing lithium-ion batteries.

BACKGROUND ART

A lithium-ion battery having a wound electrode assembly is generally fabricated in the following order. First, the wound electrode assembly is placed in an outer casing. Next, an electrolyte solution is injected into the outer casing. Thereafter, an opening of the outer casing is closed with a sealing plate.

In order for the lithium-ion battery to have a high energy density, a very large volume inside the outer casing is occupied by the electrode assembly. Therefore, the electrolyte solution injected into the outer casing is not readily impregnated into the electrode assembly. That is, the step of injecting the electrolyte solution into the outer casing requires a lot of time. If the time taken by the injection step is increased, it becomes essential to augment production equipment to carry out the injection step. This results in the need of an additional space for installation of production equipment, or leads to increase in equipment cost. Furthermore, since the electrolyte solution is evaporated into the air, the loss of the electrolyte solution also becomes large as the time taken by the injection step is increased.

A method as described below has been proposed in order to reduce the time required for the injection step. Specifically, the pressure of the environment in which an electrode assembly is placed is decreased after an electrolyte solution is injected into an outer casing. Thus, the air inside the electrode assembly and the electrolyte solution are smoothly replaced with each other, and the electrolyte solution is impregnated into the electrode assembly in a relatively short time. However, this method requires equipment for vacuuming, and therefore cannot be expected to reduce the space and cost for production equipment.

In addition, the viscosity of an electrolyte solution itself is also one of the causes that hinder the impregnation of the electrolyte solution. For example, Patent Literature 1 discloses a method in which a plurality of types of electrolyte solutions having different viscosities are prepared, and the electrolyte solutions are injected into an outer casing in order of increasing viscosity. Not only does this method require a plurality of types of electrolyte solutions, this method also requires equipment for injecting the plurality of types of electrolyte solutions into the outer casing in order. Therefore, also with this method, reduction in the space and cost for production equipment can scarcely be expected. Since a plurality of types of electrolyte solutions need to be prepared, there is also a possibility that a problem arises in acquiring the materials.

CITATION LIST

Patent Literature

Patent Literature 1: JP 2000-195549 A

SUMMARY OF INVENTION

Technical Problem

The present invention can solve conventional problems as described above, and aims to provide an improved method for producing lithium-ion batteries. More specifically, the present invention aims to provide a technique for efficiently carrying out the step of injecting an electrolyte solution.

Solution to Problem

That is, the present invention provides a method for producing lithium-ion batteries, the method including the steps of: preparing a positive electrode plate, a separator, and a negative electrode plate; combining the positive electrode plate, the separator, and the negative electrode plate so as to form a spirally-wound electrode assembly; fixing a winding end portion of the electrode assembly with a heat-sensitive adhesive whose adhesive force can be reduced by heating or cooling; placing the electrode assembly in an outer casing, and then adjusting an ambient temperature of the electrode assembly so that the electrode assembly is loosened due to reduction in the adhesive force of the heat-sensitive adhesive; and injecting an electrolyte solution into the outer casing.

Advantageous Effects of Invention

According to the present invention, after the electrode assembly is placed in the outer casing, the ambient temperature of the electrode assembly is adjusted so as to reduce the adhesive force of the heat-sensitive adhesive. The reduction in the adhesive force of the heat-sensitive adhesive loosens the electrode assembly, as a result of which a slight gap is caused between the electrode plate (the positive electrode plate or the negative electrode plate) and the separator. The electrolyte solution can permeate the gap between the electrode plate and the separator relatively smoothly. Consequently, the time required for the injection step can be reduced, and the productivity of lithium-ion batteries can thereby be improved.

In addition, since the injection step is completed in a short time, the amount of evaporation of the electrolyte solution can be reduced. The reduction in the amount of evaporation of the electrolyte solution can prevent the contained volume of the electrolyte solution from varying among products. This contributes to equalization of the performances of lithium-ion batteries. In addition, the reduction in the amount of evaporation of the electrolyte solution can also be expected to reduce environmental load and to improve working environment. Furthermore, the present invention can be suitably employed for producing a lithium-ion battery that uses a highly viscous electrolyte solution.

DESCRIPTION OF EMBODIMENTS

Hereinafter, an embodiment of the present invention will be described with reference to the accompanying drawings. However, the present invention should not be restrictively construed based on the embodiment described below.

Figure 1:
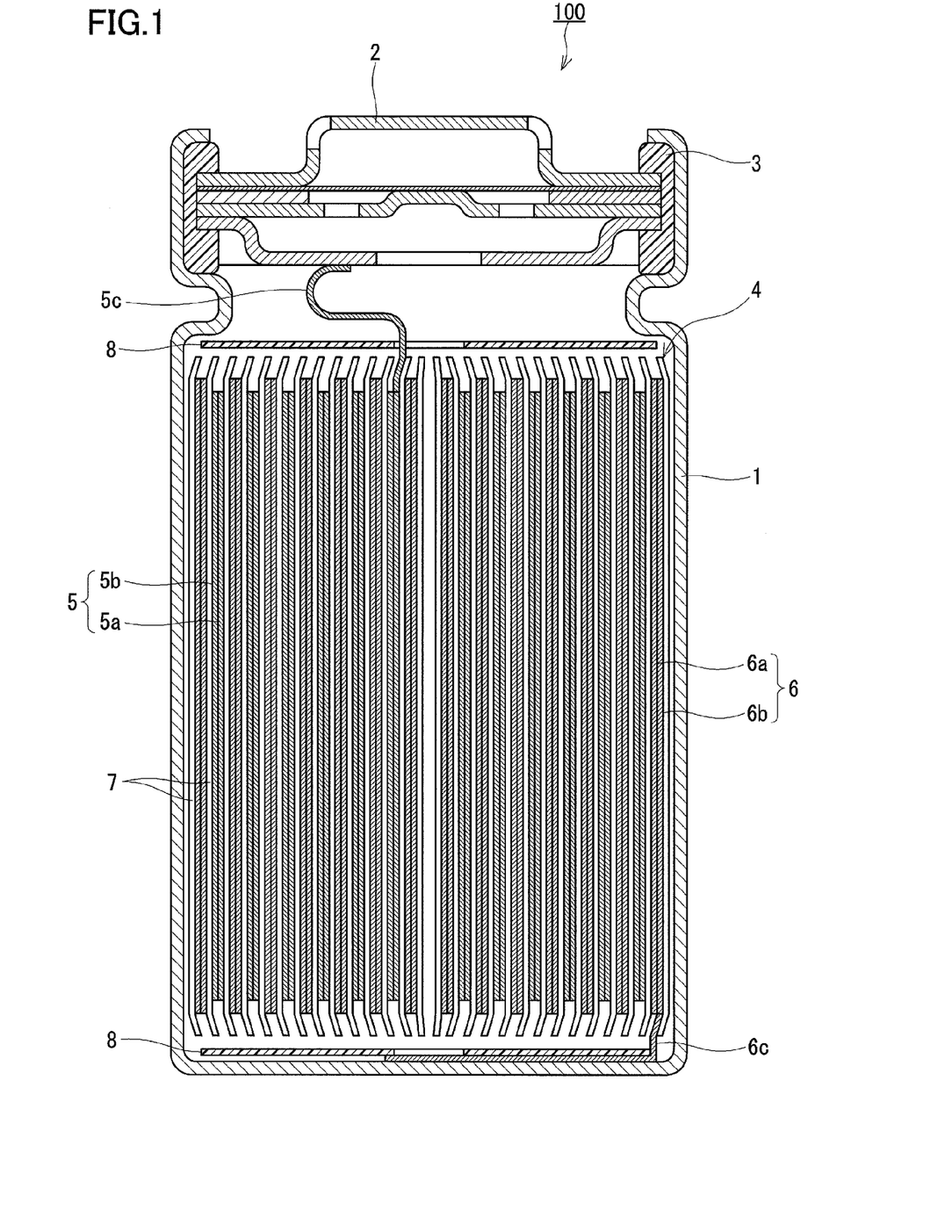
FIG. 1 is a cross-sectional view of a lithium-ion battery that can be produced by a method of the present invention.
Figure 2A:
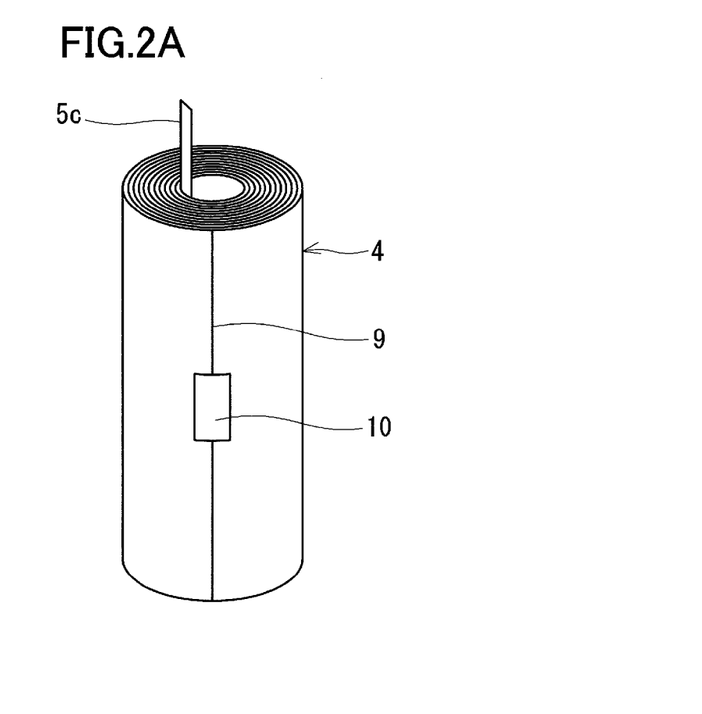
FIG. 2A is a perspective view of an electrode assembly of the lithium-ion battery shown in FIG. 1.

FIG. 1 is a cross-sectional view of a lithium-ion battery that can be produced by a method of the present invention. FIG. 2A is a perspective view of an electrode assembly of the lithium-ion battery shown in FIG. 1. A lithium-ion battery 100 has a wound electrode assembly 4, and an outer casing 1 housing the electrode assembly 4. The electrode assembly 4 includes a positive electrode plate 5, a negative electrode plate 6, and a pair of separators 7. The electrode assembly 4 is impregnated with an electrolyte solution. The opening of the outer casing 1 is closed with a sealing plate 2. The positive electrode plate 5 is composed of a positive electrode current collector 5a and a positive electrode active material layer 5b. One end of a positive electrode lead 5c is connected to the positive electrode plate 5. The other end of the positive electrode lead 5c is connected to a back surface of the sealing plate 2. An insulating packing 3 is disposed around the sealing plate 2. The negative electrode plate 6 is composed of a negative electrode current collector 6a and a negative electrode active material layer 6b. One end of a negative electrode lead 6c is connected to the negative electrode plate 6. The other end of the negative electrode lead 6c is connected to a bottom surface of the outer casing 1. Insulating rings 8 are disposed on the upper and lower surfaces of the electrode assembly 4, respectively.

As shown in FIG. 2A, the electrode assembly 4 has a cylindrical shape. However, the shape of the electrode assembly 4 is not limited to a cylindrical shape. The electrode assembly 4 may have a flat, rectangular shape in a plan view. A heat-sensitive adhesive tape 10 is attached to a winding end portion 9 (terminal edge) of the electrode assembly 4. The heat-sensitive adhesive tape 10 has the property of significantly reducing or substantially losing its adhesive force due to heating or cooling. At a room temperature (20 to 25° C.), the heat-sensitive adhesive tape 10 exerts an adhesive force needed to maintain the tightness imparted to the electrode assembly 4. As will be described later, the use of the heat-sensitive adhesive tape 10 allows reduction in the time required for the step of injecting an electrolyte solution into the outer casing 1.

"Substantially losing the adhesive force" means that an adhesive force needed to maintain the tightness imparted to the electrode assembly 4 is not exerted. More specifically, when, at a certain temperature, the adhesive strength has decreased below 10% of an adhesive strength (180 degrees peeling strength (N/25 mm)) exerted at a room temperature (23° C.), it can be determined that the adhesive force has been substantially lost. For example, the adhesive strength can be measured by a method specified in Japanese Industrial Standards JIS C 2107 (1999).

Figure 2B:
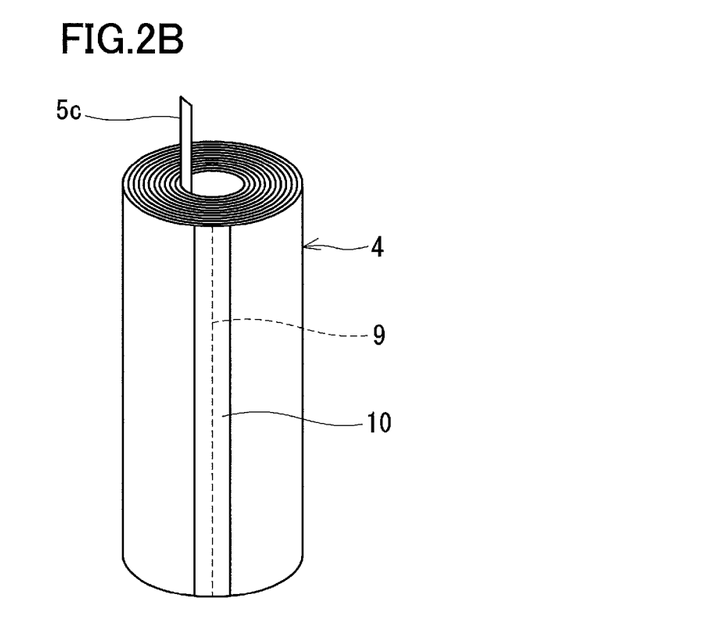
FIG. 2B is a perspective view of an electrode assembly according to a modification.

The shape, size, etc. of the heat-sensitive adhesive tape 10 are not particularly limited, as long as the tightness imparted to the electrode assembly 4 can be maintained before the electrode assembly 4 is placed in the outer casing 1. In the example of FIG. 2A, the heat-sensitive adhesive tape 10 is attached only to a part of the winding end portion 9 in the height direction of the electrode assembly 4 (the width direction of the electrode plates). As shown in FIG. 2B, the heat-sensitive adhesive tape 10 may be attached over the entire winding end portion 9 in the height direction. Furthermore, in the circumferential direction of the electrode assembly 4, the heat-sensitive adhesive tape 10 may be wound more than 360 degrees around the electrode assembly 4.

Next, the method for producing lithium-ion batteries will be described with reference to FIG. 3. First, the positive electrode plate 5, the negative electrode plate 6, and the pair of separators 7 are prepared as shown in STEP 1 of FIG. 3.

The positive electrode plate 5 can be fabricated by applying a positive electrode composite material to one or both surfaces of the positive electrode current collector 5a, and then performing drying and rolling. The positive electrode plate 5 has a thickness of, for example, 30 to 200 μm, and is preferably rich in flexibility. The positive electrode composite material can be obtained by kneading and uniformly dispersing materials such as a positive electrode active material, a binding material, and a conductive material by means of a dispersion medium.

The positive electrode current collector 5a is typically made of a metal foil. An aluminum foil can be used as the metal foil. As well as generally-used metal foils, materials such as perforated foils, expanded materials, and lath materials, can be used for the positive electrode current collector 5a. In order to enhance the adhesion between the positive electrode current collector 5a and the positive electrode active material layer 5b, the surface of the positive electrode current collector 5a may be roughened. The roughening may be performed by a physical method such as blasting or by a chemical method such as etching.

The positive electrode active material is not particularly limited, and may be any material that can reversibly absorb and release lithium ions. Typically, a lithium-containing transition metal compound can be used as the positive electrode active material. Examples of the lithium-containing transition metal compound include composite oxides containing lithium and one element selected from the group consisting of cobalt, manganese, nickel, chromium, iron, and vanadium. Specific examples include $LiCoO_2$, $LiMnO_2$, $LiNiO_2$, $LiNi_xM_{(1-x)}O_2$ (M includes at least one selected from the group consisting of Co, Mn, Fe, Mg, Ti, and Al, and x satisfies $0.3 \leq x \leq 0.95$), $LiCrO_2$, $\alpha LiFeO_2$, and $LiVO_2$.

The binding material is not particularly limited, and may be any material that can be kneaded and dispersed in the dispersion medium. Specifically, the following can be used: fluororesins such as polyvinylidene fluoride, vinylidene fluoride-hexafluoropropylene copolymer, and polytetrafluoroethylene; acrylic rubbers; modified acrylic rubbers; styrene-butadiene rubbers; acrylic resins; and vinyl resins. These binding materials may be used singly, or two or more thereof may be used in the form of a mixture. Furthermore, a copolymer of monomers used for synthesis of the above resins can also be used as the binding material. The binding material may be used in the form of a powder, or in the form of a dispersion.

As the conductive material, carbon materials such as acetylene black, graphite, and carbon fiber, can be used singly or in the form of a mixture of two or more thereof.

A solvent capable of dissolving the binding material can be used as the dispersion medium. In the case where the binding material is soluble in organic solvents, organic solvents such as N-methyl-2-pyrrolidone, N,N-dimethylformamide, tetrahydrofuran, dimethylacetamide, dimethyl sulfoxide, hexamethylsulfonamide, tetramethylurea, acetone, and methyl ethyl ketone, can be used singly or in the form of a mixed solvent of two or more thereof. In the case where the binding material is soluble in water, water or hot water can be used.

A dispersant, a surfactant, a stabilizer, a thickener etc., may be contained in the positive electrode composite material according to need. Examples of the thickener include an ethylene-vinyl alcohol copolymer, carboxymethylcellulose, and methylcellulose.

The method for applying the positive electrode composite material to the positive electrode current collector 5a is not particularly limited either. The positive electrode composite material in the form of a slurry can be applied to the positive electrode current collector 5a, using a slit die coater, a reverse roll coater, a lip coater, a blade coater, a knife coater, a gravure coater, a dip coater, or the like. The applied positive electrode composite material may be dried naturally or may be dried with a drying device (drying oven). In view of productivity, the positive electrode composite material is preferably dried with a drying device at 70 to 200° C. for 10 minutes to 5 hours.

After the drying, the positive electrode plate 5 is subjected to rolling so that the positive electrode active material layer 5b has a predetermined thickness. The rolling may be performed a plurality of times using a roll press machine, or may be performed a plurality of times by changing the pressing pressure exerted by a roll press machine. After the rolling, the positive electrode lead 5c for drawing electric power is welded to the positive electrode current collector 5a.

The negative electrode plate 6 can be fabricated by applying a negative electrode composite material to one or both surfaces of the negative electrode current collector 6a, and then performing drying and rolling. The negative electrode plate 6 has a thickness of, for example, 30 to 210 μm, and is preferably rich in flexibility. The negative electrode composite material can be obtained by kneading and uniformly dispersing materials such as a negative electrode active material, a binding material, and a conductive material by means of a dispersion medium.

Instead of the wet method described above, a dry method may be employed as a method for fabricating the negative electrode plate 6. Examples of a dry film-forming method include a vapor deposition method, a sputtering method, and a CVD method (chemical vapor deposition method). Any of these methods can be carried out under vacuum. The vapor deposition method is desirable from the standpoint of efficiently forming the negative electrode active material layer 6b. Either electron beam vapor deposition or resistance heating vapor deposition can be employed as the vapor deposition method. In the case where an oxide, a nitride, or an oxynitride is vapor-deposited, an oxide and/or a nitride can be used as an evaporation material. Reactive deposition may be performed by evaporating a negative electrode active material such as silicon and tin from an evaporation source, and simultaneously introducing oxygen gas, nitrogen gas, or ions or radicals including the constituent elements of these gases, between the negative electrode current collector 6a and the evaporation source.

A foil made of a metal such as copper and a copper alloy can be suitably used as the negative electrode current collector 6a. Examples of metal foils suitable for the negative electrode current collector 6a include rolled foils and electrolytic foils. As well as generally-used metal foils, materials such as perforated foils, expanded materials, and lath materials can be used for the negative electrode current collector 6a. In order to enhance the adhesion between the negative electrode current collector 6a and the negative electrode active material layer 6b, the surface of the negative electrode current collector 6a may be roughened. A rolled copper foil having been roughened, and an electrolytic copper foil having been roughened, are commonly used as a material of the negative electrode current collector 6a.

The negative electrode active material is not particularly limited, and may be any material that can reversibly absorb and release lithium ions. Typically, a carbon material containing graphite having a graphitic crystal structure can be used as the negative electrode active material. Examples of such a carbon material include natural graphite, spherical or fibrous artificial graphite, non-graphitizable carbon (hard carbon), and graphitizable carbon (soft carbon). Materials other than carbon materials include lithium titanate. In addition, from the standpoint of enhancing the energy density of the lithium-ion battery 100, a high-capacity material such as silicon, tin, a silicon alloy, a tin alloy, silicon oxide, silicon nitride, and tin oxide, can be used as the negative electrode active material.

A binding material, a conductive material, a dispersant, a surfactant, a stabilizer, a thickener etc., may be contained in the negative electrode composite material according to need. These materials can be the same as those used in the positive electrode plate 5.

After the negative electrode active material layer 6b is formed on the negative electrode current collector 6a, the negative electrode lead 6c for drawing electric power is welded to the negative electrode current collector 6a.

As the separator 7, a microporous membrane made of polyolefin such as polyethylene and polypropylene can be suitably used. The separator 7 may be formed of a singly-layer microporous membrane, or may be formed of a microporous membrane having a multi-layer structure. One example of the multi-layer structure is a structure in which polypropylene membranes are attached to both surfaces of a polyethylene membrane. The separator 7 has a thickness of, for example, 8 to 40 μm.

Figure 3:
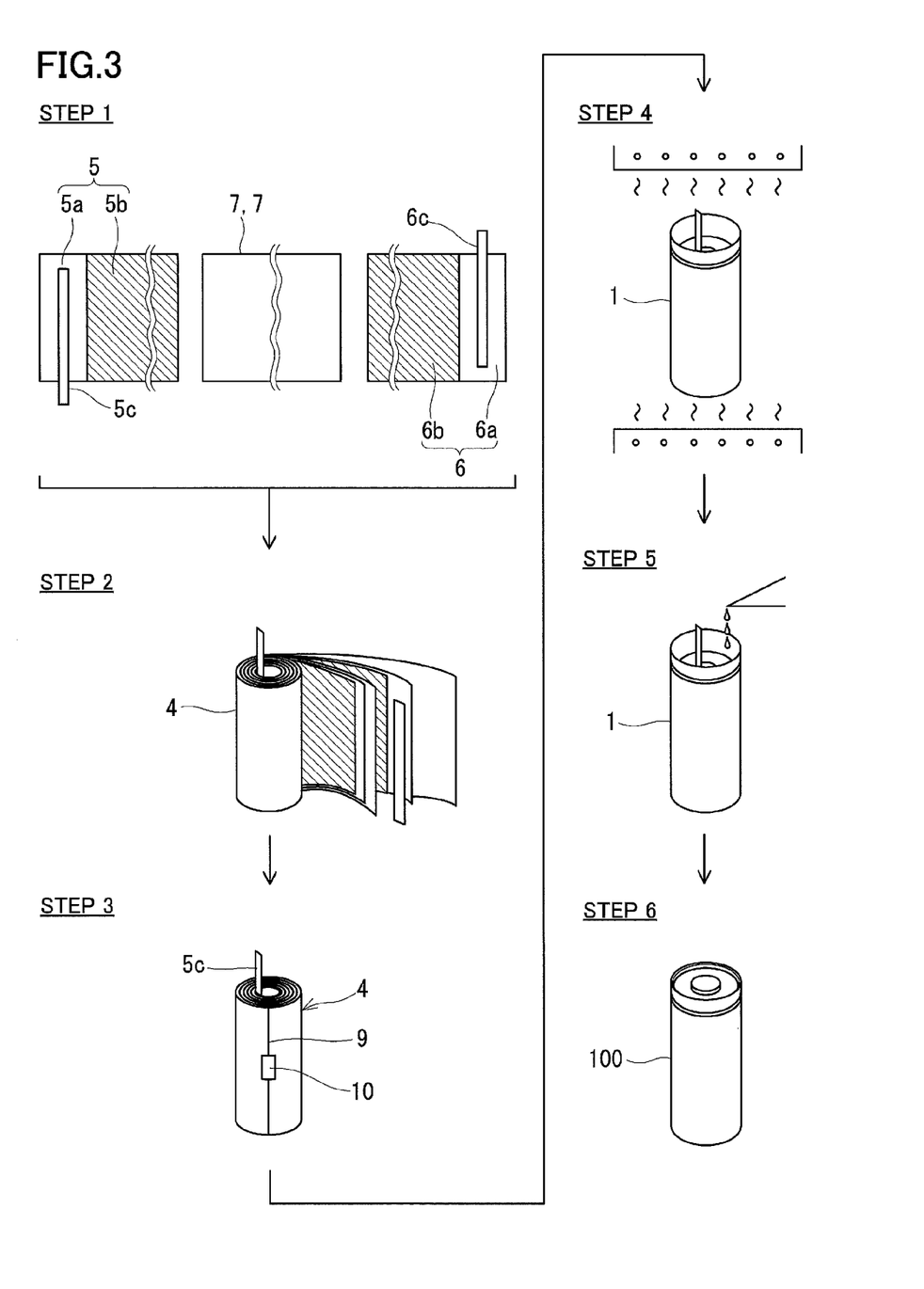
FIG. 3 is a schematic diagram showing the steps for producing a lithium-ion battery according to an embodiment of the present invention.

Next, the positive electrode plate 5, the negative electrode plate 6, and the pair of separators 7 are stacked on one another, and then wound so as to form the spirally-wound electrode assembly 4 (STEP 2 of FIG. 3). For example, the wound electrode assembly 4 has an outer diameter that is 90% or more (preferably 95% or more) of the inner diameter of the outer casing 1, before the wound electrode assembly 4 is placed in the outer casing 1. If the electrode assembly 4 has such an outer diameter, the energy density of the lithium-ion battery 100 can be sufficiently enhanced. The upper limit of the outer diameter of the electrode assembly 4 is not particularly limited, and is, for example, 99% of the inner diameter of the outer casing 1.

After completion of winding of the electrode assembly 4, the winding end portion 9 of the electrode assembly 4 is fixed with the heat-sensitive adhesive tape 10 as shown in STEP 3 of FIG. 3. Thereafter, the insulating rings 8 are disposed on the upper and lower surfaces of the electrode assembly 4, respectively, and the electrode assembly 4 is placed in the outer casing 1. Furthermore, the positive electrode lead 5c is welded to the back surface of the sealing plate 2, and the negative electrode lead 6c is welded to the bottom surface of the outer casing 1. The step of welding the positive electrode lead 5c to the back surface of the sealing plate 2 may be performed after an electrolyte solution is injected into the outer casing 1.

The outer casing 1 is a cylindrical casing having a bottom and an opening. From the standpoint of pressure resistance, nickel, iron, a nickel alloy, an iron alloy, a nickel-plated steel plate, or the like, can be used as the material of the outer casing 1.

Next, as shown in STEP 4 of FIG. 3, after the wound electrode assembly 4 is placed in the outer casing 1, the ambient temperature of the electrode assembly 4 is adjusted so that the electrode assembly 4 is loosened due to reduction in the adhesive force of the heat-sensitive adhesive tape 10. At a room temperature, the heat-sensitive adhesive tape 10 can exert an adhesive force needed to maintain the tightness imparted to the electrode assembly 4. However, the adhesive force of the heat-sensitive adhesive tape 10 is reduced by heating or cooling to such an extent that the heat-sensitive adhesive tape 10 is peeled from the electrode assembly 4.

Figure 4:
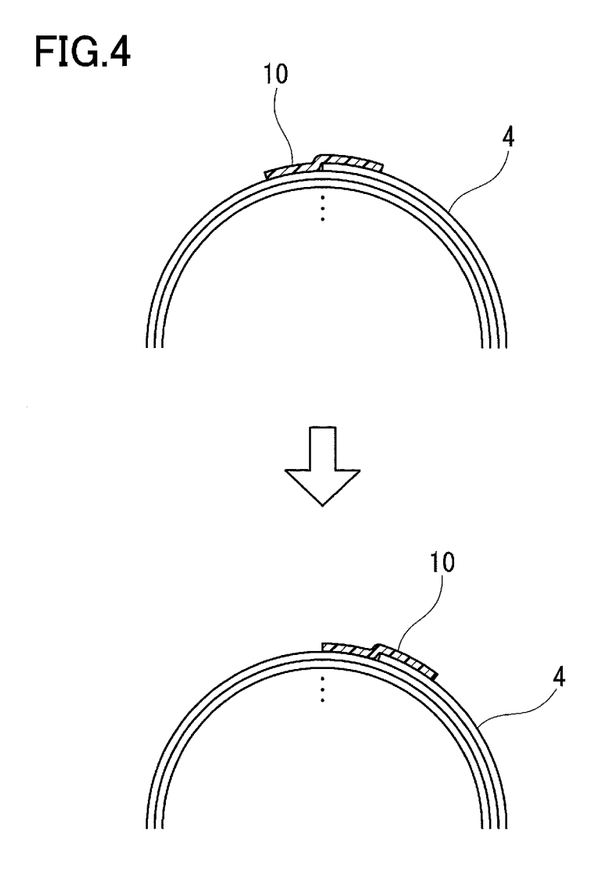
FIG. 4 is a schematic diagram showing loosening of an electrode assembly due to reduction in the adhesive force of a heat-sensitive adhesive tape.

As shown in FIG. 4, when the adhesive force of the heat-sensitive adhesive tape 10 is sufficiently reduced, the tightening force imparted to the electrode assembly 4 is weakened. As a result, the outermost circumferential portion of the electrode assembly 4 moves in the circumferential direction, and the electrode assembly 4 is slightly expanded in the radial direction. This causes a slight gap between the electrode plate (the positive electrode plate 5 or the negative electrode plate 6) and the separator 7. An electrolyte solution can smoothly permeate such a gap. Therefore, the time required for the step of injecting the electrolyte solution can be shortened. It can be thought that the outer diameter of the electrode assembly 4 becomes approximately equal to the inner diameter of the outer casing 1 after the reduction in the adhesive force of the heat-sensitive adhesive tape 10.

In the present embodiment, the heat-sensitive adhesive tape 10 has a substrate and a heat-sensitive adhesive layer formed on the substrate. However, a heat-sensitive adhesive may be applied directly to the electrode assembly 4 in the step of fixing the winding end portion 9. That is, the winding end portion 9 of the electrode assembly 4 can be fixed by applying a heat-sensitive adhesive directly to the inner side of the winding end portion 9. Depending on circumstances, the heat-sensitive adhesive tape 10 (or a heat-sensitive adhesive) and a normal adhesive tape may be used in combination.

As the substrate of the heat-sensitive adhesive tape 10, a film made of a resin such as polyethylene terephthalate, polyphenylene sulfide, polypropylene, polystyrene, polycarbonate, and polymethylmethacrylate, can be used. The resin film may be an unstretched film or a stretched film.

The heat-sensitive adhesive layer of the heat-sensitive adhesive tape 10 can be formed of a warm-off type heat-sensitive adhesive whose adhesive force is reduced or substantially lost at a temperature higher than a preset temperature (a switching temperature). With the heat-sensitive adhesive tape 10 that is of warm-off type, the step of reducing the adhesive force (temperature adjustment step) and the step of drying the electrode assembly 4 in the outer casing 1 can be performed by single heat treatment. That is, increase in the substantial number of steps can be avoided. It should be understood that the electrode assembly 4 may be dried before it is placed in the outer casing 1, or the step of drying the electrode assembly 4 may be omitted.

The composition of the warm-off type heat-sensitive adhesive is not particularly limited, as long as the adhesive force can be reduced by heating the heat-sensitive adhesive to a temperature higher than a preset temperature. Typically, the warm-off type heat-sensitive adhesive can be formed of a resin composition containing an acrylic resin as a main component. The "main component" means a component whose content is the largest in terms of % by weight.

An acrylic adhesive generally contains a copolymer of a plurality of types of acrylic monomers. By appropriately selecting acrylic monomers which are starting materials, and copolymerizing the acrylic monomers, an acrylic resin having a necessary function can be synthesized, and the synthesized acrylic resin can be used as an adhesive. When it is attempted to design an acrylic resin having desired properties, attention should be focused on the glass-transition point (Tg) and the melting point (Tm) of the acrylic resin to be synthesized. In the case where the warm-off type heat-sensitive adhesive contains an acrylic resin as a main component, the heat-sensitive property of the adhesive is due to the loss of the adhesive force caused by melting of the acrylic resin. That is, the adhesive force of the heat-sensitive adhesive is substantially lost at a temperature higher than the upper limit of a specified temperature range including the melting point of the acrylic resin, while the adhesive force of the heat-sensitive adhesive is exerted at a temperature lower than the lower limit of the specified temperature range.

As is known among persons skilled in the art, when a (meth)acrylic ester monomer is polymerized, the glass-transition point of the synthesized polymer depends on the number of carbon atoms of an alkyl group included in the (meth)acrylic ester monomer. Making use of this property allows synthesis of an acrylic resin having the intended glass-transition point.

In one example, the warm-off type heat-sensitive adhesive contains a side chain-crystallizable polymer. The "side chain-crystallizable polymer" means a polymer having a side chain moiety that can be crystallized. The side chain-crystallizable polymer can be a polymer obtained from a monomer mixture containing: an acrylic acid alkyl ester and/or a methacrylic acid alkyl ester including an alkyl group having 1 to 6 carbon atoms; a carboxy group-containing ethylenically unsaturated monomer; and an acrylic acid alkyl ester and/or a methacrylic acid alkyl ester including an alkyl group having 16 or more carbon atoms. The heat-sensitive adhesive may be formed of an adhesive composition containing the side chain-crystallizable polymer and a normal adhesive. Examples of the normal adhesive include natural rubber adhesives and acrylic adhesives. Such a heat-sensitive adhesive is described in JP 2000-355684 A, for example.

The preset temperature, at which the adhesive force of the heat-sensitive adhesive tape 10 is reduced or lost, is preferably in a temperature range of 40 to 120° C. If the preset temperature is 40° C. or higher, even when the temperature of the environment of the production process is somewhat high, the heat-sensitive adhesive tape 10 can exert a sufficient adhesive force to maintain the state of the wound electrode assembly 4. The preset temperature may be a temperature higher than or equal to 50° C. In the case where the separator 7 is made of a microporous polyolefin membrane, attention should also be paid to the upper limit of the preset temperature for the reason described below. A microporous polyolefin membrane usually has a predetermined shutdown temperature. "Shutdown" means a phenomenon in which the micropores of the separator 7 are closed due to excessive increase in the temperature of the lithium-ion battery 100. The "shutdown temperature" means a temperature at which the phenomenon occurs. Accordingly, in the case where the separator 7 includes a microporous polyolefin membrane, the preset temperature needs to be lower than the shutdown temperature. It is favorable that, in the step of adjusting the ambient temperature of the electrode assembly 4, the ambient temperature of the electrode assembly 4 is maintained at a temperature higher than the preset temperature and lower than the shutdown temperature. Although depending on the shutdown temperature of the separator 7, if the preset temperature is, for example, 120° C. or lower, the function of the separator 7 is completely maintained even after STEP 4 of FIG. 3. More preferably, the preset temperature is lower than 80° C., or lower than 70° C. If the preset temperature is appropriately low, the heat-sensitive adhesive is easily designed. The preset temperature can be in a temperature range set by any combination of the lower limit temperatures and the upper limit temperatures indicated above (e.g., higher than or equal to 50° C. and lower than 80° C.).

Figure 5A:
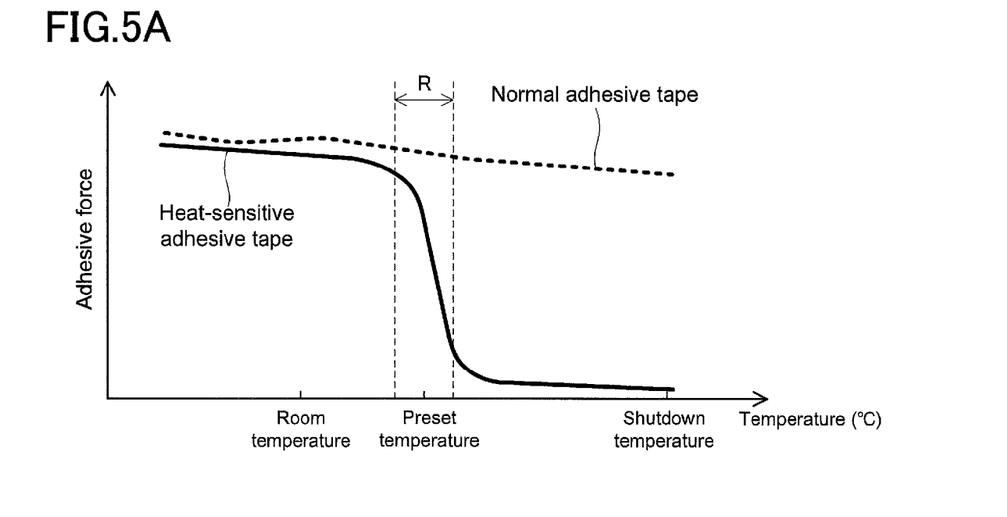
FIG. 5A is a schematic graph showing the characteristics of a heat-sensitive adhesive tape (warm-off type).

As shown in FIG. 5A, the adhesive force of an adhesive used in a normal adhesive tape decreases inversely proportional to the temperature. By contrast, the warm-off type heat-sensitive adhesive has a preset temperature in a temperature region R being in the range between a room temperature and the shutdown temperature, and is designed so that the adhesive force sharply changes around the preset temperature.

Figure 5B:
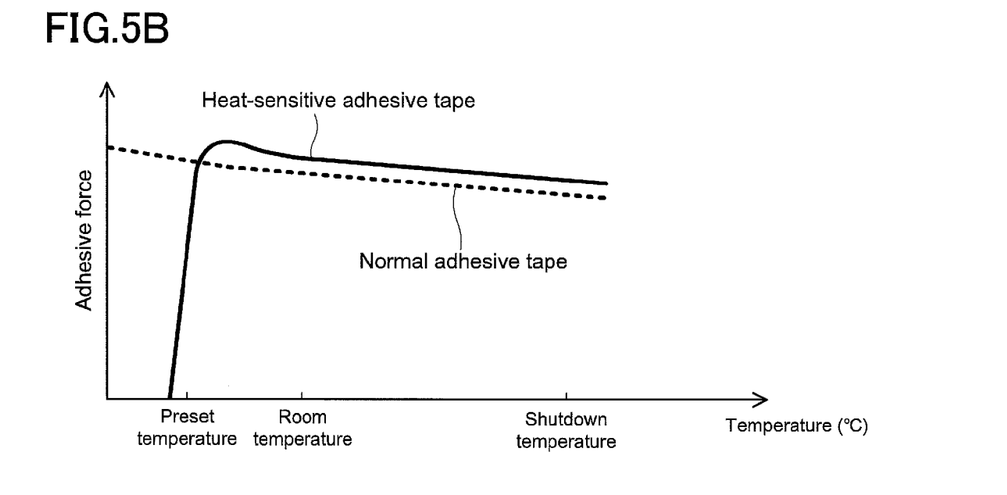
FIG. 5B is a schematic graph showing the characteristics of a heat-sensitive adhesive tape (cool-off type).

The adhesive layer of the heat-sensitive adhesive tape 10 may be formed of a cool-off type heat-sensitive adhesive whose adhesive force is reduced or substantially lost at a temperature lower than a preset temperature. The cool-off type heat-sensitive adhesive typically has the characteristics shown in FIG. 5B. The cool-off type heat-sensitive adhesive has a preset temperature lower than a room temperature, and is designed so that the adhesive force sharply changes around the preset temperature. Similar to the warm-off type heat-sensitive adhesive, the cool-off type heat-sensitive adhesive can be designed by making use of the property of an acrylic resin whose adhesive force greatly changes at a glass-transition point (Tg) and a melting point (Tm).

In addition, the heat-sensitive adhesive tape 10 may have the property of restoring the adhesive force at a room temperature after the adhesive force is reduced by heating or cooling. However, the heat-sensitive adhesive tape 10 may not necessarily have such a property in the case where the electrode assembly 4 has a sufficiently large outer diameter before it is placed in the outer casing 1. This is because the electrode assembly 4 continues to be restrained by the outer casing 1, and cannot be freely loosened even if the heat-sensitive adhesive tape 10 loses the adhesive function.

Commercially-available products usable as the heat-sensitive adhesive tape 10 include "Intelimer (registered trademark of Landec Corporation in the United States) tape" which is available from Nitta Corporation.

Next, an electrolyte solution is injected into the outer casing 1 as shown in STEP 5 of FIG. 3.

For example, the electrolyte solution contains a non-aqueous solvent and an electrolyte dissolved in the solvent. Examples of the non-aqueous solvent include ethylene carbonate, propylene carbonate, butylene carbonate, dimethyl carbonate, diethyl carbonate, γ-butyrolactone, 1,2-dimethoxyethane, 1,2-dichloroethane, 1,3-dimethoxypropane, 4-methyl-2-pentanone, 1,4-dioxane, acetonitrile, propionitrile, butyronitrile, valeronitrile, benzonitrile, sulfolane, 3-methyl-sulfolane, tetrahydrofuran, 2-methyltetrahydrofuran, dimethylformamide, dimethyl sulfoxide, dimethylformamide, trimethyl phosphate, and triethyl phosphate. These may be used singly or two or more thereof may be used in the form of a mixed solution.

A highly electron-withdrawing lithium salt can be used as the electrolyte. Specific examples include $LiPF_6$, $LiBF_4$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. One or more selected from these electrolytes can be used singly or in combination as the electrolyte. For example, the concentration of the electrolyte in the electrolyte solution is 0.5 to 1.7 mol/liter.

The step of injecting the electrolyte solution into the outer casing 1 may be performed before the ambient temperature is adjusted after the electrode assembly 4 is placed in the outer casing 1. Depending on circumstances, the electrolyte solution may be previously injected into the outer casing 1 before the electrode assembly 4 is placed in the outer casing 1.

Finally, the sealing plate 2 is fitted in the opening of the outer casing 1 to swage the opening of the outer casing 1, as shown in STEP 6 of FIG. 3. Thus, the lithium-ion battery 100 is obtained.

EXAMPLES

Example 1

An amount of 100 parts by weight of $LiNi_{0.8}Co_{0.15}Al_{0.05}O_2$ as a positive electrode active material, 5 parts by weight of acetylene black as a conductive material, and 5 parts by weight (solid content) of polyvinylidene fluoride as a binding material, were added to an appropriate amount of N-methyl-2-pyrrolidone. The mixture was thoroughly kneaded to prepare a positive electrode composite material. The positive electrode composite material was applied to a positive electrode current collector made of a band-shaped aluminum foil having a thickness of 15 μm. The applied positive electrode composite material was dried at an ambient temperature of 90° C. for 10 minutes, followed by performing rolling three times. A positive electrode lead made of aluminum was spot-welded to the positive electrode current collector. In order to prevent internal short-circuit, insulating sheets made of polypropylene were attached to the positive electrode lead in such a manner as to sandwich the positive electrode lead. Thus, a positive electrode plate having a width of 56 mm, a length of 660 mm, and a thickness of 0.13 mm, was obtained.

An amount of 100 parts by weight of flaky graphite as a negative electrode active material, 1 part by weight (solid content) of a water-soluble dispersion of a styrene-butadiene rubber as a binding material, and 1 part by weight of carboxymethyl cellulose as a thickener, were added to an appropriate amount of water. The mixture was thoroughly kneaded to obtain a negative electrode composite material. A negative electrode composite material was applied to a negative electrode current collector made of a band-shaped copper foil having a thickness of 10 μm. The applied negative electrode composite material was dried at an ambient temperature of 110° C. for 30 minutes, followed by performing rolling once. A negative electrode lead made of nickel was spot-welded to the negative electrode current collector. In order to prevent internal short-circuit, insulating sheets made of polypropylene were attached to the negative electrode lead in such a manner as to sandwich the negative electrode lead. Thus, a negative electrode plate having a width of 58 mm, a length of 750 mm, and a thickness of 0.15 mm, was obtained.

Next, the positive electrode plate, the negative electrode plate, and a pair of separators were stacked on one another, and then wound to form a spirally-wound electrode assembly. A 16 μm-thick microporous membrane made of polyethylene was used as the separators. A winding end portion of the electrode assembly was fixed with a heat-sensitive adhesive tape (Intelimer tape manufactured by Nitta Corporation, warm-off type, switching temperature: 50° C.). The adhesive force of the heat-sensitive adhesive tape is lost by heating, but is restored by cooling.

The dry weight (including the weights of the leads) of the electrode assembly was measured. Thereafter, the electrode assembly was placed in an outer casing, and the electrode assembly and the outer casing were heated in a constant-temperature chamber at 60° C. for 1 hour. A battery sample A of Example 1 was thus obtained. Welding of the positive electrode lead to a sealing plate and welding of the negative electrode lead to the outer casing were not carried out because it was necessary to take out the electrode assembly from the outer casing to measure the amount of an electrolyte solution impregnated into the electrode assembly.

Next, the battery sample A was gradually cooled to a room temperature, and 3 ml of an electrolyte solution was injected into the outer casing of the battery sample A. A non-aqueous electrolyte solution containing $LiPF_6$ at a concentration of 1.2 mol/liter was used as the electrolyte solution. A mixed solvent containing ethylene carbonate and dimethyl carbonate at a volume ratio of 2:8 was used as the solvent of the non-aqueous electrolyte solution.

After injection of the electrolyte solution, the battery sample A was allowed to stand still under an atmospheric pressure for 5 minutes. Thereafter, the electrode assembly was taken out from the outer casing, and the weight of the electrode assembly was measured quickly. Thereafter, the electrode assembly was placed in the outer casing again, and 1 ml of the electrolyte solution was additionally injected into the outer casing. Subsequently, the battery sample A was allowed to stand still under an atmospheric pressure for 25 minutes. Thereafter, the weight of the electrode assembly was measured. The electrode assembly was placed in the outer casing again, and was allowed to stand still for 30 minutes, followed by measurement of the weight of the electrode assembly.

As described above, the weight of the electrode assembly was measured 5 minutes, 30 minutes, and 60 minutes after the injection of the electrolyte solution. The measured weights were compared with the dry weight to calculate the amount of the electrolyte solution absorbed. The results are shown in Table 1. The measurement was performed for two pieces of the battery sample A.

Comparative Example 1

A battery sample B of Comparative Example 1 was obtained in the same manner as in Example 1, except that a normal adhesive tape was used instead of the heat-sensitive adhesive tape (Intelimer tape). The normal adhesive tape had a substrate made of polyphenylene sulfide and an adhesive layer made of butyl acrylate. The weight of the electrode assembly of the battery sample B was measured in the same manner as in Example 1, and the amount of the electrolyte solution absorbed was calculated.

Comparative Example 2

The same sample as the battery sample B of Comparative Example 1 was prepared as a battery sample C of Comparative Example 2. Comparative Example 2 is different from Comparative Example 1 in that a process under reduced pressure was performed after the electrolyte solution was injected into the outer casing. Specifically, after 3 ml of the electrolyte solution was injected into the outer casing, the battery sample C was placed in a dessicator, and was allowed to stand still under a reduced pressure of 260 mmHg for 1 minute. The battery sample C was then taken out from the dessicator, and allowed to stand still under an atmospheric pressure for 4 minutes. Thereafter, the electrode assembly was taken out from the outer casing, and the weight of the electrode assembly was measured quickly. Subsequently, the weight of the electrode assembly was measured in the same manner as in Example 1, and the amount of the electrolyte solution absorbed was calculated.

TABLE 1

|  | Example 1 (Sample A) | Com. Example 1 (Sample B) | Com. Example 2 (Sample C) |
| --- | --- | --- | --- |
| Type of tape | Heat-sensitive adhesive tape | Normal adhesive tape | Normal adhesive tape |
| Process under reduced pressure | Not performed | Not performed | Performed |
| Absorbed amount after 5 minutes (g) | 2.918 2.850 | 1.869 1.786 | 2.152 2.064 |
| Average absorbed amount after 5 minutes (g) | 2.884 | 1.828 | 2.108 |
| Absorbed amount after 30 minutes (g) | 4.081 3.844 | 2.866 2.560 | 3.207 3.009 |
| Average absorbed amount after 30 minutes (g) | 3.963 | 2.713 | 3.108 |
| Absorbed amount after 60 minutes (g) | 4.321 4.105 | 3.046 2.740 | 3.367 3.189 |
| Average absorbed amount after 60 minutes (g) | 4.213 | 2.893 | 3.278 |

As shown in Table 1, the absorbed amount in the battery sample A was the largest at every time point. This is thought to be due to loosening of the electrode assembly caused by reduction in the adhesive force of the heat-sensitive adhesive tape. By contrast, the absorbed amounts in the battery sample B and the battery sample C were smaller than the absorbed amount in the battery sample A. Since the battery sample C was allowed to stand still under a reduced pressure after injection of the electrolyte solution, the amount of the electrolyte solution absorbed was larger than that in the battery sample B which was allowed to stand still only under an atmospheric pressure.

Immediately after 3 ml of the electrolyte solution was injected into the outer casing of the battery sample A, the inside of the outer casing was visually observed. The electrolyte solution was quickly absorbed into the electrode assembly, and the electrolyte solution did not collect on the electrode assembly. On the other hand, when the visual observation was performed for the battery sample B, the electrolyte solution was observed to collect on the electrode assembly.

In addition, with the present invention, the following effect can also be expected. In a lithium-ion battery, there occurs a phenomenon in which the electrolyte solution is drained from the electrode assembly due to expansion of the active materials during charge. The drained electrolyte solution returns to the electrode assembly due to contraction of the active materials during discharge. If the electrolyte solution does not completely return to the electrode assembly, there is a possibility that the electrode plates have a region that is not wetted by the electrolyte solution, i.e., a region that makes no contribution to discharge. However, if the electrode assembly is appropriately loosened, the electrolyte solution drained from the electrode assembly during charge is anticipated to be able to smoothly return to the electrode assembly during discharge. Accordingly, the present invention can be expected to improve the charge/discharge characteristics of a lithium-ion battery, and therefore improve the cycle life. In the case where a high-capacity material such as silicon is used for the negative electrode, a large amount of the electrolyte solution tends to be drained from the electrode assembly during charge.

Accordingly, if the present invention is applied to a lithium-ion battery in which a high-capacity material is used, an enhanced effect may be provided.

INDUSTRIAL APPLICABILITY

A lithium-ion secondary battery produced by the method of the present invention is useful as a power supply for various electronic appliances such as mobile audio devices, mobile phones, and laptop computers.

The invention claimed is:

1. A method for producing lithium-ion batteries, the method comprising the steps of:
preparing a positive electrode plate, a separator, and a negative electrode plate;
combining the positive electrode plate, the separator, and the negative electrode plate so as to form a spirally-wound electrode assembly;
fixing a winding end portion of the electrode assembly with a heat-sensitive adhesive whose adhesive force can be reduced by heating or cooling;
placing the electrode assembly in an outer casing, and then adjusting an ambient temperature of the electrode assembly so that the electrode assembly is loosened due to reduction in the adhesive force of the heat-sensitive adhesive; and
injecting an electrolyte solution into the outer casing.

2. The method for producing lithium-ion batteries according to claim 1, wherein the heat-sensitive adhesive is a warm-off adhesive whose adhesive force is reduced or substantially lost at a temperature higher than a preset temperature.

3. The method for producing lithium-ion batteries according to claim 2, wherein
the separator includes a microporous membrane made of polyolefin,
the preset temperature is lower than a shutdown temperature of the microporous membrane, and
the ambient temperature of the electrode assembly is maintained at a temperature higher than the preset temperature and lower than the shutdown temperature in the step of adjusting the ambient temperature.

4. The method for producing lithium-ion batteries according to claim 2, wherein the preset temperature is in a temperature range of 40° C. to 120° C.

5. The method for producing lithium-ion batteries according to claim 2, wherein the preset temperature is higher than or equal to 50° C. and lower than 80° C.

6. The method for producing lithium-ion batteries according to claim 2, wherein
the heat-sensitive adhesive is formed of a resin composition containing an acrylic resin as a main component, and
the adhesive force of the heat-sensitive adhesive is substantially lost at a temperature higher than an upper limit of a specified temperature range including a melting point of the acrylic resin, and the adhesive force of the heat-sensitive adhesive is exerted at a temperature lower than a lower limit of the specified temperature range.

7. The method for producing lithium-ion batteries according to claim 1, wherein the heat-sensitive adhesive is a cool-off adhesive whose adhesive force is reduced or substantially lost at a temperature lower than a preset temperature.

8. The method for producing lithium-ion batteries according to claim 1, wherein a heat-sensitive adhesive tape having a substrate and a layer of the heat-sensitive adhesive formed on the substrate is used in the step of fixing the winding end portion.

9. The method for producing lithium-ion batteries according to claim 1, wherein the electrode assembly has an outer diameter that is 90% or more of an inner diameter of the outer casing before the electrode assembly is placed in the outer casing.

* * * * *